United States Patent
Ernvein-Pecquenard

[11] 3,792,422
[45] Feb. 12, 1974

[54] CAMERAS FOR ACOUSTIC HOLOGRAPHY

[75] Inventor: Joel Ernvein-Pecquenard, Paris, France

[73] Assignee: Thomson-CSF, Paris, France

[22] Filed: Jan. 2, 1973

[21] Appl. No.: 320,192

[30] Foreign Application Priority Data
Jan. 7, 1972 France .................. 7200495

[52] U.S. Cl. ............ 340/5 H, 340/5 MP, 73/67.5 H, 178/7.5 D
[51] Int. Cl. .................. H04n 3/02, G01n 29/04
[58] Field of Search ......... 340/5 H, 5 MP; 332/7.51; 181/.5 NP; 73/67.5 H; 178/7.5 D, DIG. 18

[56] References Cited
UNITED STATES PATENTS
| | | | |
|---|---|---|---|
| 3,723,958 | 3/1973 | Heflinger | 332/7.51 |
| 3,745,812 | 7/1973 | Korpal | 73/67.5 H |
| 3,594,717 | 7/1971 | Macovski | 340/5 H |

*Primary Examiner*—Maynard R. Wilbur
*Assistant Examiner*—N. Moskowitz
*Attorney, Agent, or Firm*—Cushman, Darby & Cushman

[57] ABSTRACT

The present invention relates to improvements in laser-scan ultrasonic cameras. In order to substitute an acoustic hologram for the acoustic image presented upon the screen of the cathode ray tube, an optical phase reference and a square-law detection of the photo-signal are added to the usual devices.

9 Claims, 3 Drawing Figures

CAMERAS FOR ACOUSTIC HOLOGRAPHY

The present invention relates to improvements in laser-scan ultrasonic cameras.

These cameras in order to display the acoustic image of an object, on the screen of a cathode ray tube, use an optical hetrodyning method, employing an interferometer coupled to a laser to detect the very weak vibrations of a diaphragm resonating under the influence of the ultrasonic waves which are passed through said object.

The invention proposes improvements in these devices in order to enable them to effect real-time production not of the image but of the hologram of the object; examination using coherent light then makes it possible to reconstitute, from said hologram, a three-dimensional image of the interior of the object through which the ultrasonic waves are passed. This result is essentially obtained by modulating, at the ultrasonic frequency, the length of the optical path through one of the channels of the interferometer.

In relation to conventional acoustic holographic devices, in which the hologram is obtained by interference between two acoustic waves, one having passed through the object and the other being used as reference, the device in accordance with the invention has the advantage that it is more sensitive and suppresses the reference acoustic wave which is difficult to obtain with the desired quality. Compared with conventional acoustic holographic devices using probe scanning, the device in accordance with the invention compensates for a lower sensitivity with a substantially higher image rate.

According to the invention, there is provided an acoustic holography camera for displaying the acoustic hologram of an object from which an ultrasonic wave of frequency Fo emerges, said camera comprising:
  an acoustic plate set into vibration by said ultrasonic wave;
  a photodetector;
  a monochromatic radiation source emetting a primary parallel beam;
  an interferometric device including beam splitter means to split said primary beam into a secondary object beam and a secondary reference beam, and projecting means to project a fraction of said secondary beams onto said photodetectors, said object beam experiencing reflexion on said acoustic plate before reaching said projecting means;
  scanning means to produce displacements of said object beam at the surface of said plate;
  display means;
  transducer means to provide to said display means voltages indicative of the amplitude of said displacements of said object beam;
  electrical transmission means including filter means and square-law detection means and being cascade arranged between said photodetector and said display means;
  said interferometric device further including modulating means and frequency shift means, both arranged on the path of one of said secondary beams, said modulating means modulating the optical length of said one secondary beam at said frequency $F_0$ and said frequency shift means shifting the frequency of said one secondary beam by a predetermined amount $F_1$, said frequency $F_1$ being in excess of $F_0$, For a better understanding of the invention, and to show how the same may be carried into effect, reference will be made to the drawings accompanying the ensuing description and in which:

Figure 1:
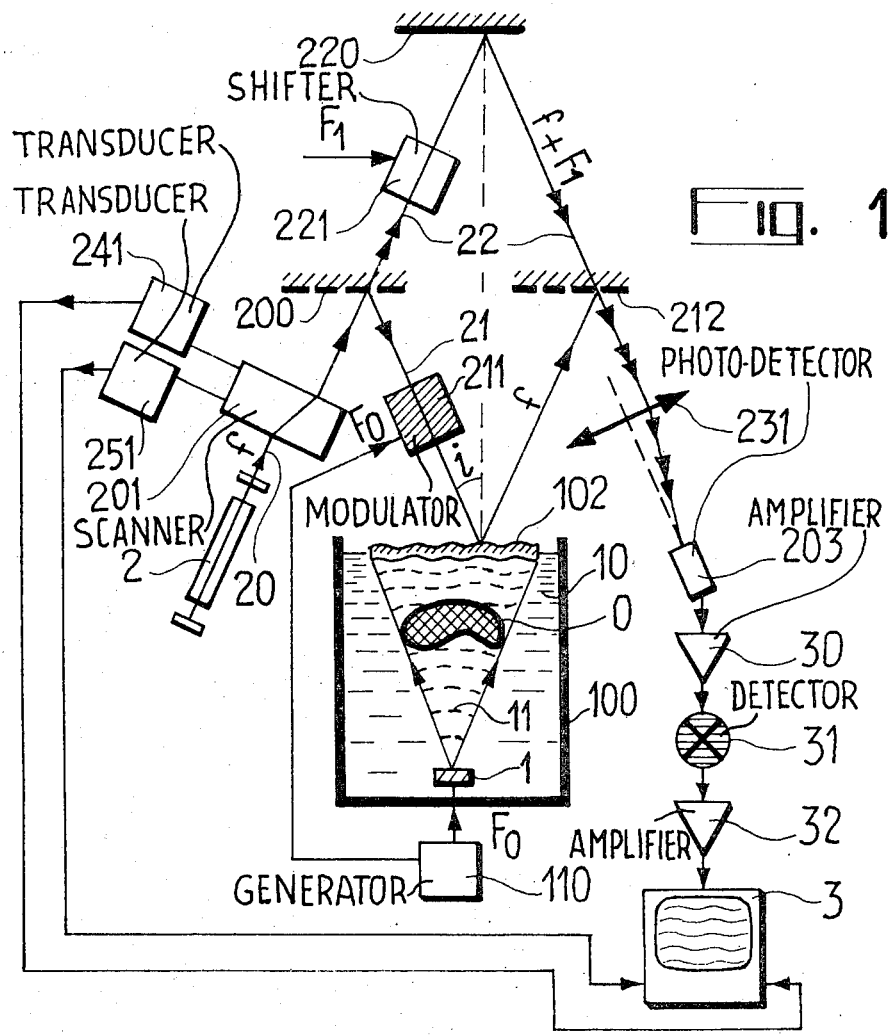
FIG. 1 illustrates a block diagram of an ultrasonic camera and improvements, proposed in accordance with the invention, for converting said camera to a holographic camera.

FIG. 1 illustrates a typical diagram of an ultrasonic image converter employing an optical heterodyning device associated with an interferometer, for the point by point measurement of the amplitude of vibration of an acoustic plate resonating under the influence of an ultrasonic beam. This same figure also illustrates (cross-hatched interior) the elements which have been added or modified in accordance with the invention in order to transform the images produced by said converter, into holograms.

A device of this kind comprises three quite distinct assemblies: an acoustic assembly, an optical assembly and an assembly for processing and displaying the signal, plus two interfaces.

The acoustic assembly comprises the object O whose image is to be obtained, this being immersed in a liquid medium 10 contained in a vessel 100. An acoustic transducer 1, excited by the generater 110, emits an ultrasonic beam 11 of frequency $F_0$, which beam is diffracted by the object O. An acoustic plate 102, resonating at a frequency $F_o$, is arranged at the liquid-air interface in order to receive the beam 11; this plate is optically reflective on its non-immersed face and constitutes the interface between the acoustic and optical sections.

The optical assembly is a two-beam interferometer. A laser source 2 emits a beam 20 of coherent, rectilinearly polarised light having a frequency f; splitter means, here represented by the semi-transparent mirror 200, divide the beam 20 into an object beam 21 reflected by the reflective face of the resonant plate 102, and a reference beam 22 reflected by the mirror 220; projection means, here represented by the semi-transparent mirror 212, disposed at the point of intersection of the two reflected beams and associated with the lens 231, project onto the photodetector 203, a fraction of the two beams, object and reference. This photodetector 203 constitutes the interface between the optical assembly and the assembly for processing and displaying the signal.

In one of the two optical channels of the interferometer, constituted by the object beam or the reference beam, an element 221, here disposed in the reference beam, is arranged to shift the frequency of the reference beam from the frequency f to the frequency $f + F_1$, where $F_1$ is substantially higher than the frequency $F_0$ of the ultrasonic source. Various devices which enable this kind of frequency shift to be carried out, utilising the Doppler effect for example, or amplitude modulation by electro-optical effect, are described in literature on the subject; another example of such device will be described later on.

The optical system furthermore comprises scanning means which enable the object beam to scan the surface of the resonant plate, and which can be arranged in front of the means 200 used to split the beam, or after the object beam; these means are schematically indicated in the Fig. 1 by the scanner 201 arranged at the output of the laser and displacing the beam 20 parallel to itself.

The assembly for processing and displaying the signal comprises a display device 3 represented in the Fig. 1 by a cathode ray oscilloscope, which is supplied on the one hand with the signal coming from the photodetector through the channel of connecting means, comprising a selective amplifier 30, a detector 31 and a low frequency amplifier 32, and, on the other hand, with the signals coming from transducers 241 and 251, these signals being voltages proportional to the displacements of the object beam on the resonant plate.

To understand the operation of this kind of device, it will be assumed, in a first stage, that the scanning elements are stationary so that the object beam is reflected from a fixed point upon the resonant plate 102.

If the transducer 1 is at rest, the plate 102 is stationary and the difference between the optical paths followed by the beams 21 and 22 remains constant in time. The photodetector 212, which carries out the square-law detection of the sum of the amplitudes of the waves transmitted by the object and reference beams, thus, if its response time is compatible with the frequency $F_1$, furnishes an electrical signal of constant amplitude and frequency $F_1$, the latter frequency being the beat frequency between the two waves.

With the transducer 1 in operation, the acoustic plate 102, designed to resonate in thickness at the frequency $F_0$, goes into resonance with the incident ultrasonic beam diffracted by the object O; the instantaneous amplitude of any point on the plate is proportional to the instantaneous amplitude of the acoustic wave at the same point, the direction of vibration being perpendicular to the plane of the plate. Since the vibrational amplitude of the point is very small compared with the optical wavelength and accordingly with the ultrasonic wave, the lateral displacement of the point of incidence can be considered as negligible. On the other hand, if $i$ is the constant angle of incidence of the beam on the resonant plate and s the peak amplitude of vibration, the difference in the optical length of the object beam will vary, at the frequency $F_0$ which is the frequency of the ultrasonic wave, by an amount $e_1 = 2s/\cos i$. Thus, the phase of the object wave is modulated at the frequency $F_0$, but because of the small size of $e_1$, the amplitude of the phase modulation is very small compared with $2\pi$; it can be shown that under these circumstances, the signal at the output of the photodetector, comprises in addition to the fixed amplitude component of frequency $F_1$, two side bands of frequencies $F_1 + F_0$ and $F_1 - F_0$ whose amplitudes are a function of the amplitude and phase of the deformation of the resonant plate at the point of incidence. By filtering this signal to leave only one of these side bands, it will be seen that after amplification and detection the signal applied to the display device is characteristic of the vibrational state of the liquid medium in the interface plane.

When the scanning means displace the point of incidence at the surface of the plate, it is readily verified that the difference in optical path length between the two beams, object and reference, is independant of the position of the beams and is a function solely of the vibrational state of the resonant plate; even if this is not strictly true, this will simply be because, at the scale of vibrational amplitudes of the resonant plate, the mirrors 200, 212 and 220 cannot be considered as perfectly flat, and the variations in optical path length resulting as a consequence are produced at the scanning frequency, which is very low compared with the frequency $F_0$; the result is, in the signal furnished by the photodetector, the production of two supplementary side bands very close to the centre frequency $F_1$, which do not therefore affect the signal of frequency $F_1 \pm F_0$ isolated by the filter. Under these conditions, the displacement of the oscilloscope spot being synchronous with the displacement of the point of incidence of the object beam on the resonant plate and its intensity being characteristic of the vibrational state of the liquid in the interface plane, there will be reproduced upon the display screen the acoustic image of the object immersed in the vessel.

To transform this image into a hologram, the invention proposes:

to add to said device, in the optical assembly, means which make it possible to sinusoidally modulate at the frequency $F_0$ of the ultrasonic beam, the optical length taken by the object beam or the reference beam, said means being represented in Fig. 1 by the modulator 211 arranged in the path of the object beam 21 and controlled by the same generator 110 which supplies the transducer 1. This modulator may be constituted, by way of non-limitative example, by a vibrating mirror or again by an electro-optical medium whose refractive index is varied by a control voltage;

to arrange that, in the assembly responsible for processing and display of the signal, the detector device 32, be a square-law detector.

Figure 2:
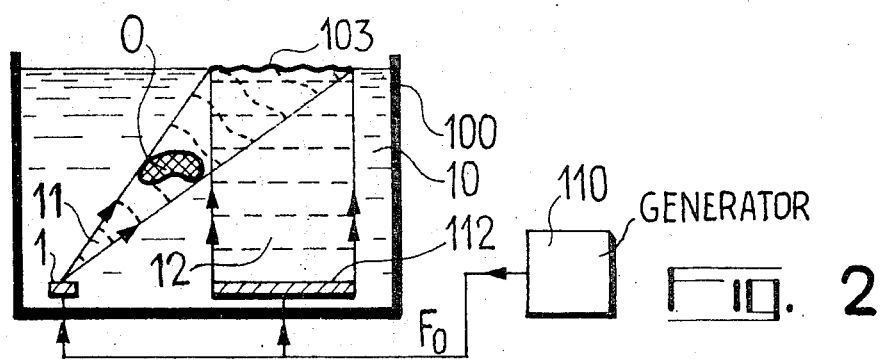
FIG. 2 is an explanatory diagram.

Fig. 2, which illustrates a conventional acoustic holographic device, helps to understand how the above described modifications make it possible to substitute, on the display screen, a hologram for a simple acoustic image.

In this figure, a certain number of the elements already encountered in the acoustic assembly of Fig. 1, can be seen; the object O, immersed in the liquid medium 10 contained in the vessel 100, and the ultrasonic beam 11, of frequency $F_0$, emitted by the transducer 1 under the control of the generator 110, and diffracted by the object O. But in addition, there is the parallel beam 12, of the same frequency $F_0$ as the beam 11, which is emitted by the transducer 112; transducers 1 and 112 are piloted by the same generator 110. This acoustic reference beam 12 does not pass through the object O and meets the liquid-air interface at normal incidence, where it interferes with the diffracted beam 11. An oil film 103 is arranged at the liqud-air interface, in the zone of interference between the two beams. Unlike the case with the resonant plate, this film does not resonate with the acoustic vibration, but acquires a permanent deformation proportional to the acoustic pressure, proportional to the square of the peak amplitude of the ultrasonic vibration. In other words, the oil film carries out square-law detection of the received acoustic signals in the same manner that a photographic emulsion, sensitive under appropriate lighting conditions, to the luminous intensity and therefore to the square of the amplitude of the optical wave, carries out square-law detection of an optical signal.

At any point on the interface, it can be seen that the vibration, variable in amplitude and phase, of frequency $F_0$, which corresponds to the acoustic wave 11 diffracted by the object, is added to the vibration of the same frequency but constant in amplitude and phase, corresponding to the flat reference wave 12. The oil film, which carries out square-law detection of the resultant vibration, produces an acoustic hologram of the object in the same manner as a photo sensitive plate which, in optical holography, receives a reference wave superimposed upon the wave diffracted by the object.

By comparing the devices in accordance with the invention with this conventional device, it will be seen that by examining any point on the interface, there is superimposed upon the vibration, variable in amplitude and phase, of the acoustic plate resonating under the influence of the wave diffracted by the object, a vibration of the same frequency but of constant amplitude and phase, which results from the action of the modulator 211; these two vibrations are added in amplitude in order to modulate the length of the optical path. The result is entirely identical to that which would be obtained if, at the resonant plate, a flat ultrasonic reference wave were superimposed upon the wave diffracted by the object. However, the means utilized to achieve this result are simpler to put into effect; in other words, it is difficult indeed, over a large area, to obtain a flat acoustic wave of good quality; furthermore, the need to provide in one and the same vessel two ultrasonic beams of which one, the reference beam, must not encounter the object being examined, is avoided.

Thus, in the image-forming device originally described, the modulation of the optical path takes the form at the output of the photodetector, of an electrical signal whose amplitude is proportional not to the complex amplitude of the wave diffracted by the object, but to the sum of the complex amplitudes of said wave and the reference wave. As explained hereinbefore, to obtain from such a signal, the hologram of the object, it is necessary to carry out a square-law detection in a manner performed by the oil film 103 in FIG. 2. This function is fulfilled by the square-law detector 32.

Figure 3:
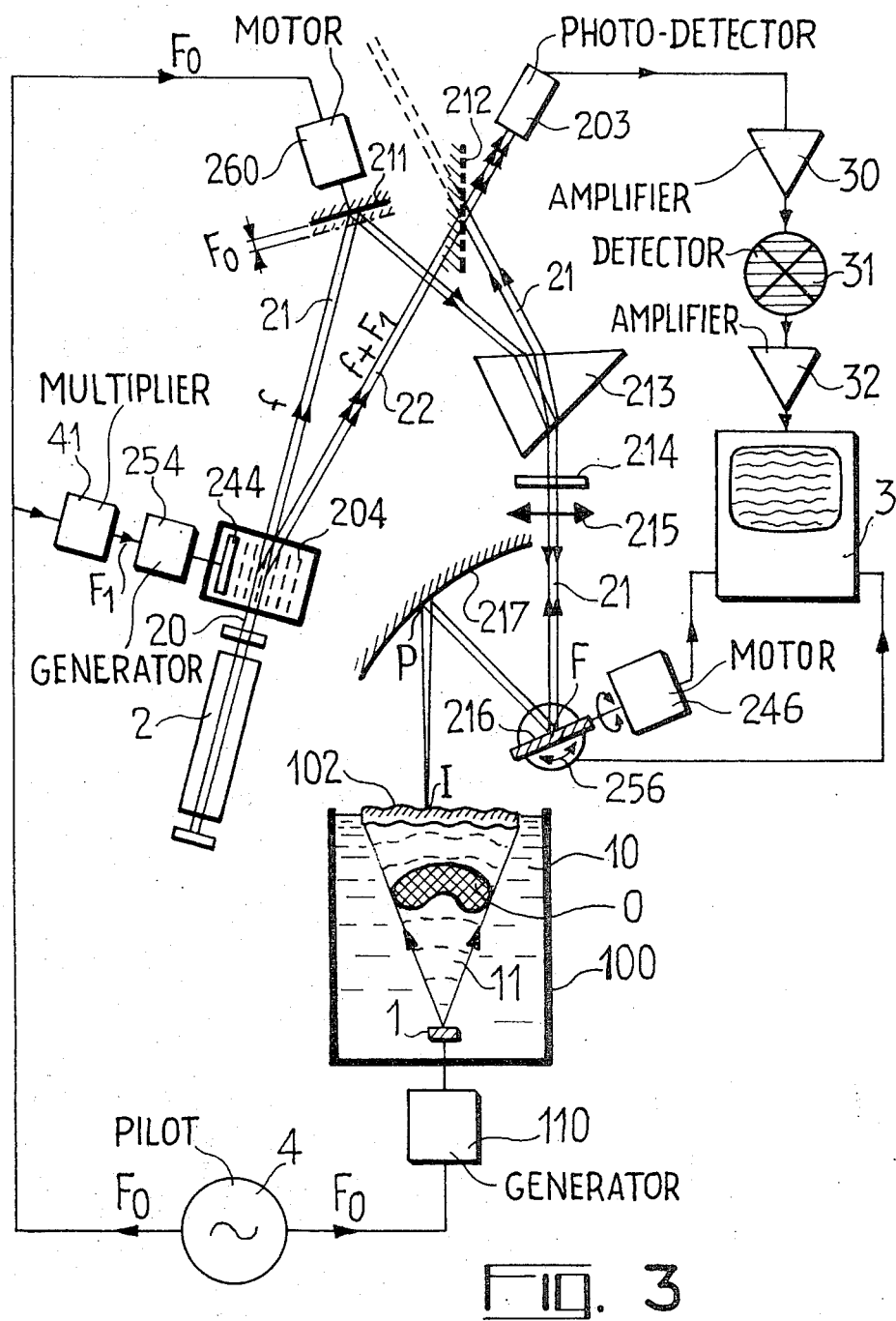
FIG. 3 illustrates a practical embodiment of a camera in accordance with the invention.

FIG. 3 illustrates by way of non-limitative example, a practical embodiment of the device in accordance with the invention, and corresponding with the block diagram of FIG. 1; this embodiment makes it possible to display upon the screen of a cathode ray tube, the acoustic hologram of an object. This device improves a known ultrasonic image converter device of G. A. MASSEY (An Optical Heterodyne Ultrasonic Image Converter, Proc. IEEE 56, 12, 1968), used for the display of ultrasonic images, and adapts it for purposes of holography.

In this figure, can be seen, as already described in the device represented in FIG. 1, the three distinct assemblies: acoustic, optical and the assembly for processing and displaying the signal, and also their two interfaces.

The acoustic assembly and the acoustic-optical interface, are strictly in accordance with the description given in relation to FIG. 1, to which reference will be made.

The optical assembly, identical in principle to that shown in FIG. 1, is slightly modified as far as the relative dispostions of its elements are concerned. The laser source 2 emits the rectilinearly polarised light beam 20 of frequency f. The means used to split said beam into two subsidiary beams, object and reference, and the means used to shift the frequency of one of the two beams, are here combined in a single element constituted by the Bragg cell 204, arranged in the path of the beam 20. This cell is constituted by a vessel filled with a liquid in which an acoustic transducer 244, excited at frequency $F_1$ ($F_1$ being a harmonic of $F_0$) by the generator 254, emits a progressive ultrasonic wave, flat and parallel to the axis of the beam 20. This cell splits the incident beam into two subsidiary beams; a direct beam 21 utilized as object beam, of frequency $f$, and a diffracted beam 22, utilized as reference beam, of frequency $f + F_1$.

The object beam 21 encounters the optical path modulator, constituted by the mirror 211 vibrating, under the action of the motor 260, at the same frequency $F_0$, as the ultrasonic transducer 1. It then passes through the prism 213, cut in a double-refracting material (Calcite for example), then the quarter-wave plate 214 and the lens 215, to ultimately meet the scanning device which is thus arranged in the path of the object beam in this instance. This scanning device is essentially constituted by an off-axis parabolic mirror 217, the axis of which is perpendicular to the plane of the resonant plate 102, and by a mirror 216 moveable round the focus F of the paraboloid and executing two vibrational movements at right angles to one another, at the line scan and field scan rates, under the control of motors 24 and 256; the focus F is arranged on the trajectory of the beam 21 which, after successive reflections at the mirrors 216 and 217 encounters the reflective surface of the resonant plate at normal incidence, the plate reflecting it back on itself, the path of the reflected ray remains coincidental with that of the incident ray until the prism 213 is encountered, the latter changing the trajectory.

At the point of intersection of the object 21 and reference 22 beams, the semi-transparent mirror 212 is arranged which projects onto the photomultiplier 203 a fraction of the energy contained in these two beams.

The assembly used to process and display the signal, similarly to that described in FIG. 1, comprises an amplifier 30 which is selective of the frequency $F_1 - F_0$, a square-law detector 31 and a low-frequency amplifier 32, these elements providing the connection between the output of the photomultipler and the display device which is constituted by a cathode ray tube 3. The output signal from the low frequency amplifier is applied to the modulating electrode of the tube and modulates the beam intensity. In addition, synchronising voltages, coming from the scanning motors 246 and 256 and proportional to the displacements of the object beam on the resonant plate, are applied to the scanning arrangements of the tube 3 and control the displacement of the electron-beam. The screen of the cathode ray tube will then display the acoustic hologram of the object O.

The camera also comprises a pilot stage 4 emitting a signal of frequency $F_0$, which controls on the one hand the generator 110 and the motor 260, and on the other hand, after passing through a multiplier stage 51 which converts it into a signal of frequency $F_1$, the latter a harmonic of $F_0$, controls the generator 254 supplying the Bragg cell.

Still by way of non-limitative example, the frequency $F_0$ produced by the pilot stage has been made equal to 5 MHz. The multiplier stage multiplies this frequency by 5 and therefore supplies to the Bragg cell a frequency $F_1$ of 25 MHz. The scanning frequencies have been made equal to 200 Hz in the case of the line scan function and 0.5 Hz in the case of the field scan function, and make it possible to produce upon the oscilloscope screen a 400 lines image at the rate of one field per second.

The basic principles of operation of this device have been set out therebefore, following the description of FIG. 1. At this stage, therefore, the description will be restricted to detailing some specific elements.

The lens 215 produces, from the quasi-parallel beam emitted by the laser, a point spot on the surface of the resonant plate.

The double-refracting prism 213 receives a rectilinearly polarised flat wave; it is so arranged that the direction of polarisation of the incicent radiation is parallel to one of its main directions; after transiting the quarter-wave plate 216 twice, outwards and back again the direction of polarisation of the radiation which enters the prism on return, will have been rotated through 90° and now be parallel to the other main direction; the prism thus, vis-a-vis the radiation, exhibits two diferent refractive indices prior to and after reflection at the resonant plate, these corresponding to the two main directions, and therefore deflects the beam through two different angles; the association of the double-refracting prism and the quarter-wave plate, thus constitutes a beam-splitter which makes it possible to apply the beam to the resonant plate at normal incidence.

The scanner device, constituted by the moving mirror 216 and the off-axis parabolic mirror 217, displaces the object beam at the surface of the resonant plate whilst maintaining it parallel thereto, this by maintaining the optical path constant with the exception of the imperfections which the parabolic mirror surface may contain. In other words, since the beam 21, by design, is constrained to pass through the focus F of the paraboloid which reflects it parallel to its axis, the length FP + PI (P and I respectively being the points of incidence upon the parabolic mirror and the resonant plate) is constant, in accordance with a well known geometric property of the parabola. This scanning device thus has a manifest advantage over the rotary prism device of the MASSEY arrangement, in which device the optical path of the object beam varies with the position of the point of incidence on the resonant plate.

What I claim is:

1. An acoustic holography camera for displaying the acoustic hologram of an object from which an ultrasonic wave of frequency $F_o$ emerges, said camera comprising:
   an acoustic plate set into vibration by said ultrasonic wave;
   a photodetector;
   a monchromatic radiation source emitting a primary parallel beam;
   an interferometric device including beam splitter means to split said primary beam into a secondary object beam and a secondary reference beam, and projecting means to project a fraction of said secondary beams onto said photodetector, said object beam experiencing reflexion on said acoustic plate before reaching said projecting means;
   scanning means to produce displacements of said object beam at the surface of said plate;
   display means;
   transducer means to provide to said display means voltages indicative of the amplitude of said displacements of said object beam;
   electrical transmission means including filter means and square-law detection means and being cascade arranged between said photodetector and said display means;
   said interferometric device further including modulating means and frequency shift means, both arranged on the path of one of said secondary beams, said modulating means modulating the optical length of said one secondary beam at said frequency $F_o$ and frequency shift means shifting the frequency of said one secondary beam by a predetermined amount $F_1$, said frequency $F_1$ being in execess of $F_o$.

2. A camera as claimed in claim 1, wherein said splitter means and said frequency shift means comprise a single Bragg cell operating at said frequency $F_1$.

3. A camera as claimed in claim 1, wherein said scanning means associate an off-axis parabolic mirror and a flat turning mirror, said turning mirror having two rotation axes located in his reflecting plane and passing by the focus of said parabolic mirror.

4. A camera as claimed in claim 3, wherein said parabolic mirror and said turning mirror are both arranged on the path of said object beam, said parabolic mirror being located in front of said acoustic plate and having his revolution axes perpendicular to said plate.

5. A camera as claimed in claim 1, wherein said interferometric device further comprises birefringent means arranged on the path of said object beam for respectively transmitting said object beam originating from said splitting means toward said plate and said object beam reflected by said plate toward said projecting means; said object beam reaching said plate at normal incidence and portions of said object beam respectively originating from said splitting means and transmitted toward said projecting means having distinct paths.

6. A camera as claimed in claim 5, wherein said birefringent means comprise arranged in cascade a birefringent prism and a quarter-wave birefringent plate.

7. A camera as claimed in claim 1, wherein said modulating means comprise a vibratory mirror.

8. A camera as claimed in claim 1, wherein said modulating means comprise a flat plate, the refractive index of said plate being electrically modulated.

9. A camera as claimed in claim 1, wherein the resonnant frequency of the thickness mode of said acoustic plate is substantially equal to said frequency $F_o$.

* * * * *